A. G. & R. HEINLE.
Nut-Lock.

No. 198,740. Patented Jan. 1, 1878.

Witnesses.
Robert S. Sill
Geo. C. Stewart

Inventors
Albert G. Heinle
and Robert Heinle
per Josiah W. Ells
attorney

UNITED STATES PATENT OFFICE.

ALBERT G. HEINLE AND ROBERT HEINLE, OF PITTSBURG, PENNSYLVANIA.

IMPROVEMENT IN NUT-LOCKS.

Specification forming part of Letters Patent No. 198,740, dated January 1, 1878; application filed March 31, 1877.

*To all whom it may concern:*

Be it known that we, ALBERT G. HEINLE and ROBERT HEINLE, of Pittsburg, in the county of Allegheny and State of Pennsylvania, have invented a new and useful Improvement in Bolts and Nut-Locks, which invention will be readily understood from the following description, taken in connection with the accompanying drawings, wherein—

Figure 1:
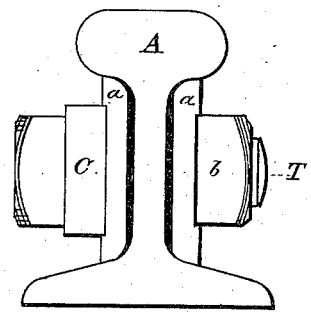
Figure 2:
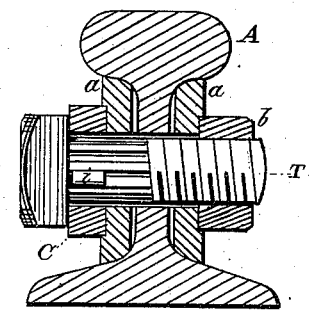
Figure 3:
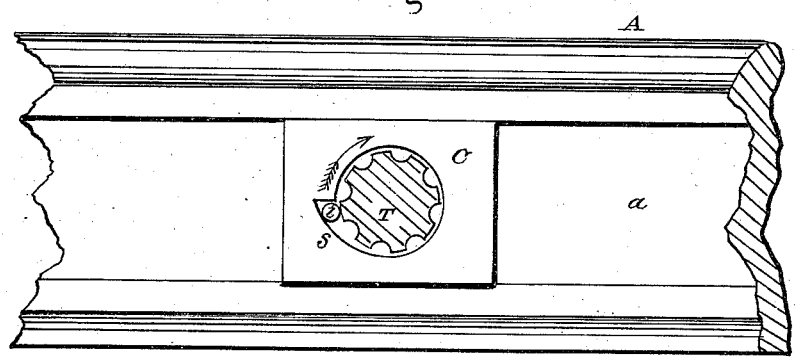

Figure 1 represents an end view of a railway-rail having applied thereto our improved fish-bars, bolt, and nut-lock. Fig. 2 represents a transverse vertical section of the same; Fig. 3, a front view and plan of our contrivance, the head of the bolt being detached to exhibit the means by which the bolt is prevented from turning back or unscrewing.

Our invention consists of an improved mode of securing the bolts and nuts used in connection with side plates or fish-bars, as applied to hold the adjacent ends of railway-rails.

Heretofore bolts used for such purposes were prevented from turning on their axis and unscrewing by reason of their shape and the shape of the holes through which they were made to pass, and the nuts rotated on the screw of the bolts, as in ordinary cases, and various means have been employed to prevent such nuts from unscrewing, and consequently the bolts from getting loose.

In our invention the side plates or fish-bars $a\ a$, like others in use, have holes punched through them for the reception of bolts, &c., but differ in having the face or outside recessed, which recess extends the entire length of the plate, and from one-eighth to a quarter of an inch in depth, and of a width equaling the breadth of the nut $b$ employed on one side, and the thick washer C on the opposite side. Into their recesses the nuts and washers fit loosely, but are prevented from turning therein by the walls of such recesses.

To bind the parts together, one fish-bar is placed on each side of the rail A, and with their respective recesses outward. Into one of these is placed the nut $b$, and in the other the thick washer C. The bolt is then passed through the washer, fish-bars, and rail, till its point enters the nut, when, by rotating the bolt in the direction indicated by the arrow, it may be screwed into the nut until all the parts are firmly drawn together.

The bolt T is constructed with a series of longitudinal shallow grooves around its neck, underneath its head, and the washer is formed with an inclined recess on one side of its hole, into which a short, loose, round pin, $i$, is placed, so that when the bolt is screwed up any attempt in a reverse direction will cause the longitudinal grooves in its neck to engage with the loose pin $i$, and carry it down the incline $s$ of the eccentric hole, and so thoroughly wedge the parts together as to bring about a complete and perfect locking of the bolt.

To accomplish the object of our invention, we have fluted the neck of the bolt; yet the same object may be obtained by having it square, triangular, or even oval, in transverse section, or in fact any other form than that of a perfect round; and the eccentric hole, or the hole with an incline, after the manner shown, may be made in the fish-bar, to avoid the use of a washer; or in case they are both used, a thin metallic plate may be interposed between the washer and fish-bar, as a better security for and to prevent any end play and consequent displacement of the loose pin $i$.

Having thus briefly described the nature of our invention, we wish it distinctly understood that we do not limit ourselves to the precise condition or shape of parts, as these may be varied without departing from the spirit of our invention; but

We claim—

1. As a means of securing the side plates or fish-bars on the adjacent ends of railway-rails, the grooved necked bolt T, in combination with the loose pin $i$ and eccentric hole $s$ in the washer C, substantially in the manner shown and described.

2. A bolt, T, having a neck or shank of fluted or other described irregular shape in cross-section, in combination with loose rotating pin $i$ and eccentric recess $s$ in the wall of the hole through which the bolt-neck passes, substantially as set forth.

ALBERT GEORGE HEINLE.
ROBERT HEINLE.

Witnesses:
JOSIAH W. ELLS,
ROBERT S. SILL.